F. H. MEYERS.
Car Coupling.

No. 60,923. Patented Jan. 1, 1867.

Witnesses:
Theo Tusch
J. A. Service

Inventor:
Fred H. Meyers
Per Munn & Co.
Attys

United States Patent Office.

FREDERICK H. MEYERS, OF WILMINGTON, DELAWARE.

Letters Patent No. 60,923, dated January 1, 1867.

IMPROVED CAR COUPLING.

The Schedule referred to in these Letters Patent and making part of the same.

TO ALL WHOM IT MAY CONCERN:

Be it known that I, FREDERICK H. MEYERS, of Wilmington, in the county of New Castle, and State of Delaware, have invented a new and useful improvement in Car Coupling; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention consists in the combination of the lever to which the bolt is pivoted, the spring catch that holds the lever and bolt suspended, the sliding-rod, by the action of which the lever and bolt are released, and the coiled spring that brings the spring catch and sliding-rod back to their places, with each other and with the bolt and bumper, as hereinafter more fully described.

Figure 1:
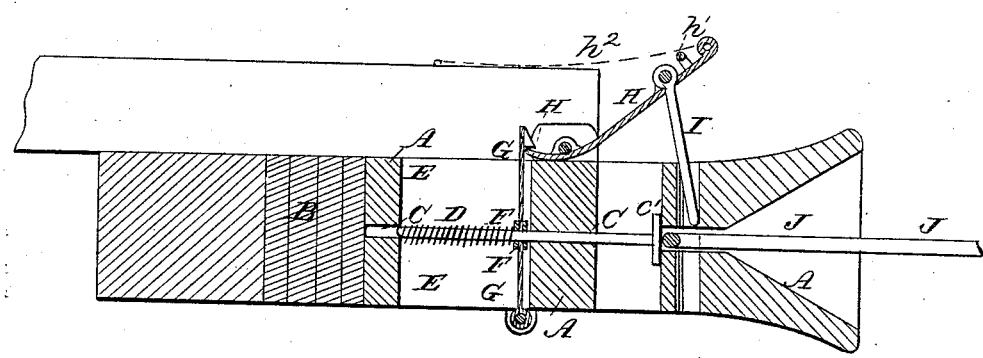
Figure 1 is a vertical longitudinal section of my improved car coupling, taken through the line $x\,x$, fig. 2.
Figure 2:
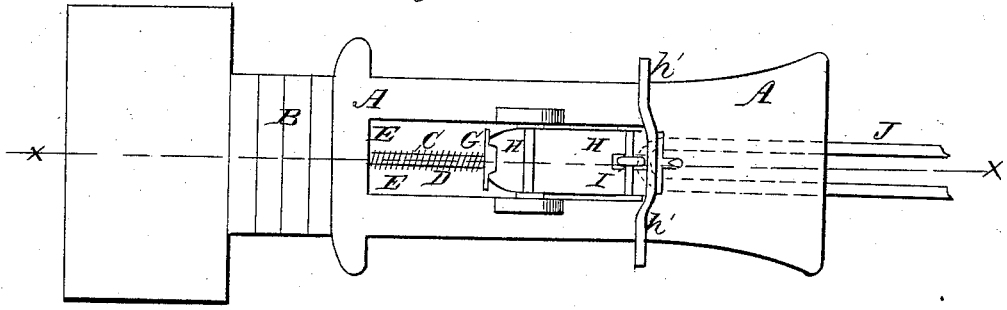
Figure 2 is a top view of the same, the platform being removed.

A is the bumper, which is attached to the frame of the car in the usual manner. B is a rubber spring or packing, placed between the rear end of the bumper and the frame of the car to relieve the jar when the cars come together. C is a bolt passing through and working in a hole formed horizontally through the centre of the bumper B. To the forward end of the rod C is attached, or upon it is formed, a cap or plate, $c'$, which is held forward against the rear end of the cavity of the bumper head that receives the link by the spring D coiled around the rear part of the bolt C. The rear end of the spring rests against the rear wall of the chamber E, formed in the bumper B, and its forward end presses against the washers F, which are held to their places by a pin passing through the said bolt C in front of said washers, as shown in fig. 1. G is the spring catch, the lower end of which is pivoted in the lower part of the chamber E, or to ears projecting downward from the lower edges of the side walls of said chamber, as shown in fig. 1. The central part of the spring catch G is slotted for the passage of the rod C, and the said catch is placed between the washers F upon said rod. Upon the upper end of the bar G is formed a catch, which takes hold of the rear end of the lever H. The lever H is pivoted between projections formed upon the upper part of the bumper B, and its rear end is curved or bent into such a form that when the forward end of said lever is raised the said rear end may be caught and held by the catch G. I is the bolt that holds the link J in coupling the cars, the upper end of which bolt is pivoted to the forward end of the lever H, so that when the forward end of the said lever is raised the bolt will be drawn out and will be held suspended until the rear end of the lever is released from the catch G. Handles $h^1$ may be attached to the forward end of the lever H, for convenience in uncoupling the cars from the ground. $h^2$ is a chain, one end of which is attached to the forward end of the lever H, and the other end secured to the platform or top of the car, for convenience in uncoupling the cars from those positions. The link J must be of such a length that when the bumpers of two adjacent cars meet it may strike the plate $c'$, push back the spring catch G, and let the bolt I drop, coupling the cars.

I claim as new, and desire to secure by Letters Patent—

The combination of the lever H, spring catch G, the sliding-rod C, and coiled spring D, with each other and with the bolt I and bumper A, substantially as herein shown and described.

FREDERICK H. MEYERS.

Witnesses:
S. HERSEY,
CHARLES JONES.